United States Patent
Huo

(10) Patent No.: US 11,265,807 B2
(45) Date of Patent: Mar. 1, 2022

(54) METHOD FOR NETWORK SHARING ON A TERMINAL, APPARATUS, AIR CONDITIONER AND STORAGE MEDIUM

(71) Applicants: GD MIDEA AIR-CONDITIONING EQUIPMENT CO., LTD., Guangdong (CN); MIDEA GROUP CO., LTD., Guangdong (CN)

(72) Inventor: Weiming Huo, Guangdong (CN)

(73) Assignees: GD MIDEA AIR-CONDITIONING EQUIPMENT CO., LTD., Foshan (CN); MIDEA GROUP CO., LTD., Foshan (CN)

(*) Notice: Subject to any disclaimer, the term of this patent is extended or adjusted under 35 U.S.C. 154(b) by 0 days.

(21) Appl. No.: 16/876,732

(22) Filed: May 18, 2020

(65) Prior Publication Data

US 2020/0280908 A1    Sep. 3, 2020

Related U.S. Application Data

(63) Continuation of application No. PCT/CN2018/084909, filed on Apr. 27, 2018.

(30) Foreign Application Priority Data

Dec. 13, 2017    (CN) .......................... 201711348003.4

(51) Int. Cl.
*H04W 76/10*    (2018.01)
*H04W 84/12*    (2009.01)
(Continued)

(52) U.S. Cl.
CPC ........... *H04W 48/16* (2013.01); *H04W 48/10* (2013.01); *H04W 76/10* (2018.02); *H04W 84/12* (2013.01); *H04W 92/10* (2013.01)

(58) Field of Classification Search
CPC ....... H04W 84/12; H04W 88/06; H04W 4/80; H04W 84/18; H04W 36/14; H04W 48/18;
(Continued)

(56) References Cited

U.S. PATENT DOCUMENTS

2007/0083470 A1    4/2007 Bonner et al.
2009/0168676 A1*   7/2009 Olson ............... H04W 52/0229
                                                            370/311
(Continued)

FOREIGN PATENT DOCUMENTS

CN    104566865 A    4/2015
CN    104640234 A    5/2015
(Continued)

OTHER PUBLICATIONS

Search Report and Written Opinion dated Jul. 11, 2018 received in International Patent Application No. PCT/CN2018/084909 together with an English language translation.
(Continued)

*Primary Examiner* — Daniel Lai
(74) *Attorney, Agent, or Firm* — Scully Scott Murphy & Presser

(57) ABSTRACT

The present disclosure discloses a method for network sharing on a terminal including a plurality of WI-FI modules. The method includes: obtaining, after a WI-FI module connects to a network, network connection information of the WI-FI module connected to the network; and sending the network connection information to a to-connect WI-FI module of the terminal, to enable the to-connect WI-FI module to connect to the network according to the network connection information. An apparatus for network sharing, air conditioner and storage medium are also disclosed.

20 Claims, 4 Drawing Sheets

(51) Int. Cl.
*H04W 48/16* (2009.01)
*H04W 48/10* (2009.01)
*H04W 92/10* (2009.01)

(58) Field of Classification Search
CPC . H04W 76/10; H04W 28/08; H04W 72/1215; H04W 4/70; H04W 88/02; H04W 76/14; H04W 76/15; H04W 88/08; H04W 40/246; H04W 48/16; H04W 48/10; H04W 92/10; H04W 12/069; H04W 12/50; H04W 48/08; G05B 2219/2613; H04N 21/414; H04L 2012/2847; H04L 2012/285; H04L 12/28; H04L 12/2803
See application file for complete search history.

(56) References Cited

U.S. PATENT DOCUMENTS

| | | | | |
|---|---|---|---|---|
| 2014/0067131 | A1* | 3/2014 | Park | H04L 12/2818 700/275 |
| 2017/0251422 | A1* | 8/2017 | Kadmany | H04L 67/02 |
| 2017/0353374 | A1* | 12/2017 | Shatil | H04L 12/4625 |
| 2018/0324874 | A1* | 11/2018 | Wu | H04W 4/60 |
| 2018/0376370 | A1* | 12/2018 | Shellhammer | H04L 27/02 |
| 2019/0158180 | A1* | 5/2019 | Wang | H04W 52/0203 |
| 2020/0053649 | A1* | 2/2020 | Yao | H04W 72/0406 |

FOREIGN PATENT DOCUMENTS

| | | |
|---|---|---|
| CN | 105592504 A | 5/2016 |
| CN | 105759937 A | 7/2016 |
| CN | 106304319 A | 1/2017 |
| CN | 106455132 A | 2/2017 |
| CN | 106792994 A | 5/2017 |
| CN | 107360615 A | 11/2017 |
| CN | 108112052 A | 6/2018 |
| WO | 2013/006315 A1 | 1/2013 |
| WO | 2015/183387 A1 | 12/2015 |

OTHER PUBLICATIONS

First Office Action dated May 18, 2020 received in International Patent Application No. CN 201711348003.4 together with an English language translation.
Supplementary European Search Report dated Nov. 20, 2020 received in European Patent Application No. EP 18 88 9455.
Notice of Second Office Action dated Nov. 24, 2020 received in Chinese Patent Application No. CN 201711348003.4 together with an English language translation.

* cited by examiner

METHOD FOR NETWORK SHARING ON A TERMINAL, APPARATUS, AIR CONDITIONER AND STORAGE MEDIUM

CROSS-REFERENCE TO RELATED APPLICATIONS

The present application is a continuation of PCT International Application No. PCT/CN2018/084909, filed on Apr. 27, 2018, which claims priority to Chinese Patent Application No. 201711348003.4, filed on Dec. 13, 2017, the entire disclosures of which are incorporated herein by reference.

TECHNICAL FIELD

The present disclosure relates to the field of network information technology, and more particularly relates to a method for network sharing on a terminal, apparatus, air conditioner and non-transitory storage medium.

BACKGROUND

With development of network technology, information exchanges are performed more and more frequently among terminals, and data volume involved in information exchanges increases gradually. Therefore, data transmission is usually slow when transmitting data with large volume, which affects the efficiency of information exchange.

For existing terminals, data transmission rate may be increased by setting up and using multiple network modules in a terminal for data transmission. However, the multiple network modules need to be manually connected to a network one by one before data transmission, resulting in cumbersome operations of network connections for a terminal with multiple network modules.

SUMMARY

According to one aspect of the present disclosure, there is provided a method for network sharing on a terminal, apparatus, air conditioner and storage medium, aiming to deal with a technical problem of cumbersome operations of network connections for a terminal with multiple WI-FI modules.

According to one aspect of the present disclosure, there is provided a method for network sharing on a terminal, including following steps:

obtaining, after a WI-FI module connects to a network, network connection information of the WI-FI module connected to the network;

sending the network connection information to a to-connect WI-FI module of the terminal, to enable the to-connect WI-FI module to connect to the network according to the network connection information.

Optionally, after sending the network connection information to a to-connect WI-FI module of the terminal, the method further includes:

obtaining, when detecting data to be transmitted, data information corresponding to the data to be transmitted, and determining a WI-FI module to perform data transmission according to the data information;

controlling the WI-FI module to perform data transmission to transmit the data to be transmitted.

Optionally, the step of obtaining data information corresponding to the data to be transmitted, and determining a WI-FI module to perform data transmission according to the data information, includes:

obtaining, when detecting data to be transmitted, data size corresponding to the data to be transmitted, determining a WI-FI module to perform data transmission according to the data size.

Optionally, the step of obtaining data information corresponding to the data to be transmitted, and determining a WI-FI module to perform data transmission according to the data information, includes:

obtaining, when detecting data to be transmitted, information of a receiving terminal corresponding to the data to be transmitted, determining a WI-FI module to perform data transmission according to the receiving terminal.

Optionally, before obtaining network connection information of the WI-FI module connected to the network, the method further includes:

obtaining, when detecting a request of network connection, network connection information of the request of network connection and terminal information of a transmitting terminal;

determining a WI-FI module corresponding to the request of network connection, according to the terminal information;

sending the network connection information to a WI-FI module corresponding to the request of network connection, to enable the WI-FI module to connect to the network according to the network connection information.

Optionally, the method for network sharing on a terminal further includes:

obtaining, when detecting a WI-FI module powered-on, a system file corresponding to the WI-FI module;

sending the system file to the WI-FI module, to enable the WI-FI module to operate.

Optionally, before obtaining a system file corresponding to the WI-FI module, the method further includes:

determining, when detecting a WI-FI module powered-on, whether the WI-FI module is a preset WI-FI module;

executing, if the WI-FI module is a preset WI-FI module, the step of obtaining a system file corresponding to the WI-FI module.

Furthermore, according to another aspect of the present disclosure, there is also provided an apparatus for network sharing on a terminal, which includes: a memory, a processor, and a program for network sharing stored on the memory and executable on the processor, wherein the program for network sharing, when executed by the processor, implements steps of the method for network sharing on a terminal as described above.

Furthermore, according to another aspect of the present disclosure, there is also provided an air conditioner, which includes: a memory, a processor, and a program for network sharing stored on the memory and executable on the processor, wherein the program for network sharing, when executed by the processor, implements steps of the method for network sharing on a terminal as described above.

Furthermore, according to yet another aspect of the present disclosure, there is also provided a computer readable storage medium having a program for network sharing stored thereon, wherein the program for network sharing, when executed by a processor, implements steps of the method for network sharing on a terminal as described above.

According to the method for network sharing on a terminal, apparatus, air conditioner and storage medium presented by several embodiments of the present disclosure, for a terminal having a plurality of WI-FI modules, after a WI-FI module connects to a network, network connection information of the WI-FI module connected to the network can be obtained; and the network connection information can be sent to a to-connect WI-FI module in the terminal, to enable the to-connect WI-FI module to connect to the network according to the received network connection information. Therefore, network connection can be shared among WI-FI modules, network connection operations can be simplified and data transmission rate can be improved.

The implementation, functional characteristics and advantages of the present disclosure will be further described with reference to the attached drawings in combination with embodiments.

DETAILED DESCRIPTION

It will be appreciated that the specific embodiments described herein are merely illustrative of the present disclosure and are not intended to limit the present disclosure.

A main solution provided according to an embodiment of the present disclosure:

obtaining, after a WI-FI module connects to a network, network connection information of the WI-FI module connected to the network;

sending the network connection information to a to-connect WI-FI module of the terminal, to enable the to-connect WI-FI module to connect to the network according to the network connection information.

With conventional technologies, operations of network connections for a terminal with multiple WI-FI modules are rather cumbersome.

According to the present disclosure, a solution is provided, for a terminal having a plurality of WI-FI modules, after a WI-FI module connects to a network, network connection information of the WI-FI module connected to the network can be obtained; and the network connection information can be sent to a to-connect WI-FI module in the terminal, to enable the to-connect WI-FI module to connect to the network according to the received network connection information. Therefore, network connection can be shared among WI-FI modules, network connection operations can be simplified and data transmission rate can be improved.

Figure 1:
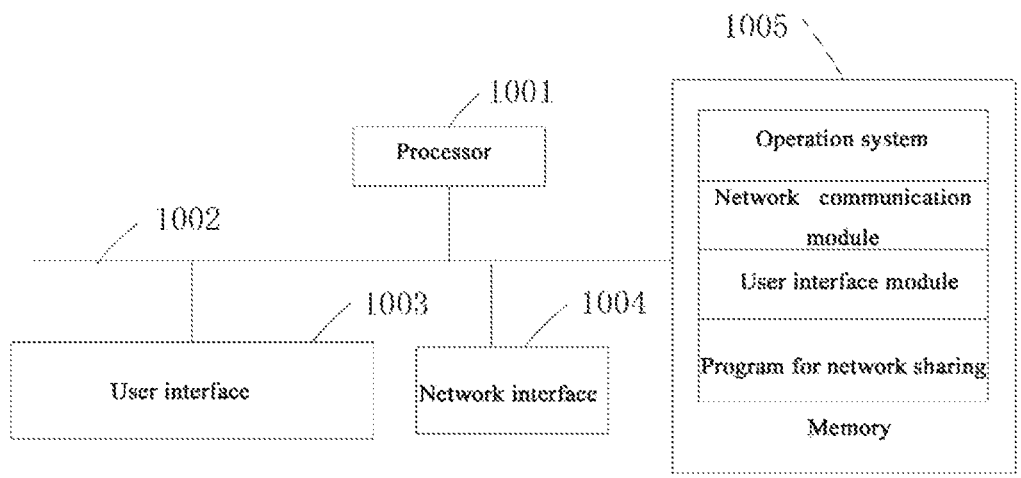
FIG. 1 is a structural schematic diagram of a terminal in a hardware operating environment in accordance with embodiments of the present disclosure.

As shown in FIG. 1, a structural schematic diagram of a terminal is presented in a hardware operating environment in accordance with embodiments of the present disclosure.

The terminal in the embodiments of the present disclosure may be an air conditioner, a smart household electrical appliance such as a TV set, a laundry machine, a refrigerator, or a terminal equipment having a plurality of WI-FI modules such as a smartphone, a tablet computer, PC, a portable computer.

As shown in FIG. 1, the terminal can include: a processor 1001, such as CPU, a network interface 1004, a user interface 1003, a memory 1005, and a communication bus 1002. The communication bus 1002 is configured to facilitate connection and communication between these components. The user interface 1003 can include a display, an input unit such as a keyboard. The user interface 1003 can also include a wired interface and wireless interface. The network interface 1004 can include a standard wired interface, and a wireless interface (such as a WI-FI interface). The memory 1005 can include a high-speed RAM memory, or a non-volatile memory such as a disk memory. The memory 1005 can also include a storage device that is separate from the processor 1001 described above.

Those skilled in the art would understand that the terminal is not limited to the structure of the terminal illustrated in FIG. 1. Thus, the terminal may include more or less components than those illustrated, or some components can be combined, or some components can be differently arranged.

As shown in FIG. 1, the memory 1005 as a computer storage medium can store an operation system, a network communication module, a user interface module and a program for network sharing.

In the terminal shown in FIG. 1, the network interface 1004 is configured to connect to a background server and communicate data with the background server; the user interface 1003 is configured to connect to the client (user side) and communicate data with the client; and the processor 1001 is configured to execute the program for network sharing stored in the memory 1005, with following operations:

obtaining, after a WI-FI module connects to a network, network connection information of the WI-FI module connected to the network;

sending the network connection information to a to-connect WI-FI module of the terminal, to enable the to-connect WI-FI module to connect to the network according to the network connection information.

Further, the processor 1001 may be configured to execute the program for network sharing stored in the memory 1005, with following operations:

obtaining, when detecting data to be transmitted, data information corresponding to the data to be transmitted, and determining a WI-FI module to perform data transmission according to the data information;

controlling the WI-FI module to perform data transmission to transmit the data to be transmitted.

Further, the processor 1001 may be configured to execute the program for network sharing stored in the memory 1005, with following operations:

obtaining, when detecting data to be transmitted, data size corresponding to the data to be transmitted, and determining a WI-FI module to perform data transmission according to the data size.

Further, the processor 1001 may be configured to execute the program for network sharing stored in the memory 1005, with following operations:

obtaining, when detecting data to be transmitted, information of a receiving terminal corresponding to the data to be transmitted, and determining a WI-FI module to perform data transmission according to the receiving terminal.

Further, the processor 1001 may be configured to execute the program for network sharing stored in the memory 1005, with following operations:

obtaining, when detecting a request of network connection, network connection information of the request of network connection and terminal information of a transmitting terminal;

determining a WI-FI module corresponding to the request of network connection, according to the terminal information;

sending the network connection information to a WI-FI module corresponding to the request of network connection, to enable the WI-FI module to connect to the network according to the network connection information.

Further, the processor 1001 may be configured to execute the program for network sharing stored in the memory 1005, with following operations:

obtaining, when detecting a WI-FI module powered-on, a system file corresponding to the WI-FI module;

sending the system file to the WI-FI module, to enable the WI-FI module to operate.

Further, the processor 1001 may be configured to execute the program for network sharing stored in the memory 1005, with following operations:

determining, when detecting a WI-FI module powered-on, whether the WI-FI module is a preset WI-FI module;

executing, if the WI-FI module is a preset WI-FI module, the operation of obtaining a system file corresponding to the WI-FI module.

Figure 2:
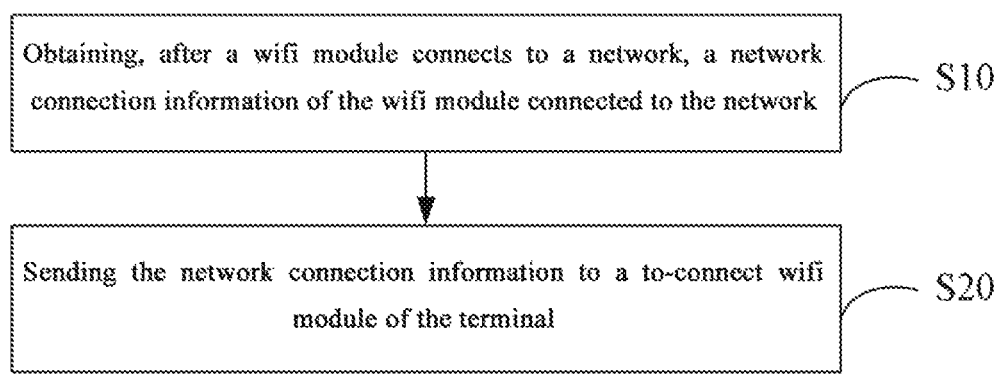
FIG. 2 is a flow chart of a first embodiment of a method for network sharing on a terminal in accordance with the present disclosure.

With reference to FIG. 2, a first embodiment of a method for network sharing according to the present disclosure is presented, which includes:

Step S10, obtaining, after a WI-FI module connects to a network, network connection information of the WI-FI module connected to the network.

For a terminal such as an air conditioner having a plurality of WI-FI modules, after one or more WI-FI modules are detected to be connected to a network, network connection information of the WI-FI module for the network connected to, may be obtained. The network connection information mainly includes network name, network address, and network password.

The WI-FI modules in the air conditioner may connect to the network by ways of, for example, a terminal associated with a WI-FI module sending network connection information, to enable the WI-FI module to obtain the network connection information and connect to the network; or a user inputting network connection information in a user interface of the air conditioner, to enable a WI-FI module to obtain the network connection information and connect to the network, and so on.

Step S20, sending the network connection information to a to-connect WI-FI module of the terminal, to enable the to-connect WI-FI module to connect to the network according to the network connection information.

The network connection information is send to a to-connect WI-FI module (a WI-FI module to connect to the network), then the to-connect WI-FI module may connect to the network according to the network connection information, without a need of network connection operation by a user on each WI-FI module waiting for network connection, which reduces time consumed on network connection, and improves efficiency of network connection. With more WI-FI modules in the terminal connected to the network, information exchange can be executed faster, and thus efficiency of data transmission can be improved, upon receiving information exchange instructions such as data transmission instruction or data acquisition instruction.

According to the present disclosure, for a terminal having a plurality of WI-FI modules, after a WI-FI module is detected to be connected to a network, network connection information of the WI-FI module connected to the network can be obtained; and the network connection information can be sent to a to-connect WI-FI module in the terminal, to enable the to-connect WI-FI module to connect to the network according to the received network connection information. Therefore, network connection can be shared among WI-FI modules, network connection operations can be simplified and data transmission rate can be improved.

Figure 3:
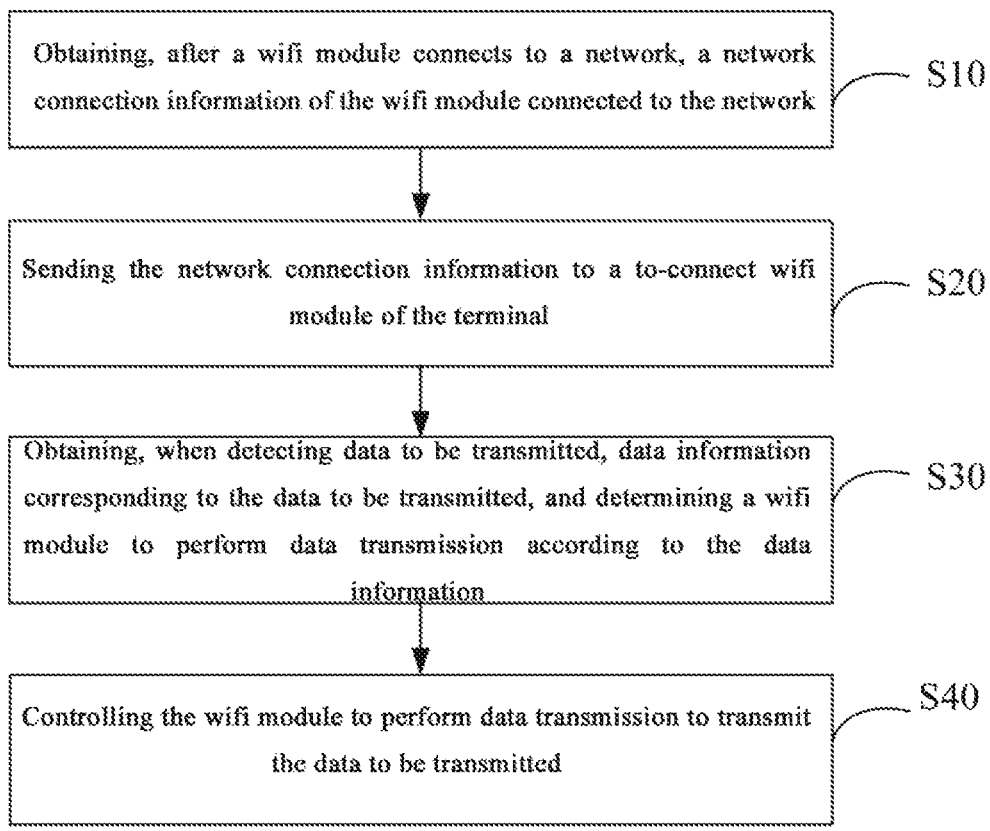
FIG. 3 is a flow chart of a second embodiment of a method for network sharing on a terminal in accordance with the present disclosure.

With reference to FIG. 3, a second embodiment of a method for network sharing on a terminal is provided, on the basis of the first embodiment, after step S20, the method further includes:

Step S30, obtaining, when detecting data to be transmitted, data information corresponding to the data to be transmitted, and determining a WI-FI module to perform data transmission according to the data information.

Step S40, controlling the WI-FI module to perform data transmission to transmit the data to be transmitted.

Upon receiving a data transmission signal, the terminal obtains data information of the data to be transmitted. According to the data information of the data to be transmitted, a WI-FI module selected for data transmission can be determined. A processor of the terminal or a server to which the terminal associates will control the WI-FI module to perform data transmission, providing a prompt and efficient data transmission process.

Usually, a WI-FI module may be determined according to data size of the data to be transmitted. For example, multiple WI-FI modules with higher performance and higher transmission speed may be selected when data size is large, to improve transmission efficiency. When data size is relatively small, a single WI-FI module or WI-FI modules with relatively lower performance may be selected, in order to reduce memory usage of the terminal, and relieve slowdowns in performance due to data transmission.

Further, information of a receiving terminal corresponding to the data to be transmitted, may be obtained, then a WI-FI module to perform data transmission may be selected according to the receiving terminal, such that the WI-FI module to perform data transmission can match with the data receiving terminal, to avoid data transmission failure and improve data transmission rate.

In this embodiment, when a data transmission instruction is received, steps of detecting data to be transmitted, obtaining data information of the data to be transmitted, selecting a WI-FI module to perform data transmission according to the data information, and controlling the WI-FI module to perform data transmission to transmit data to be transmitted, can facilitate effective transmission of data, and improve data transmission rate.

Figure 4:
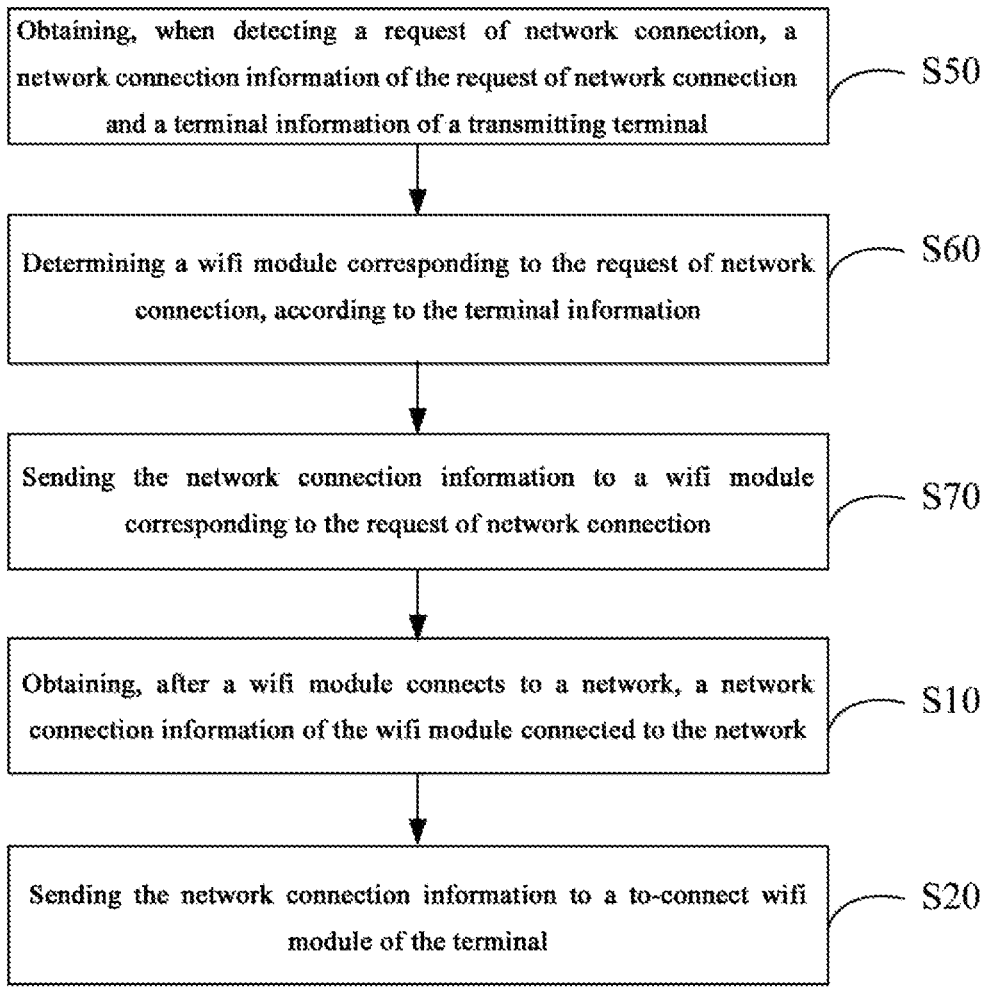
FIG. 4 is a flow chart of a third embodiment of a method for network sharing on a terminal in accordance with the present disclosure.

With reference to FIG. 4, a third embodiment of a method for network sharing on a terminal is provided, on the basis of the first or second embodiment, before step S10, the method further includes:

Step S50, obtaining, when detecting a request of network connection, network connection information of the request of network connection and terminal information of a transmitting terminal.

Step S60, determining a WI-FI module corresponding to the request of network connection, according to the terminal information.

When receiving a request of network connection, as the terminal may has a plurality of WI-FI modules, there's a need to obtain network connection information of the request of network connection and terminal information of a terminal who sends the request of network connection. A WI-FI module matching with the terminal can be searched with the terminal information, i.e., a WI-FI module corresponding to the request of network connection.

Step S70, sending the network connection information to a WI-FI module corresponding to the request of network connection.

After determining a WI-FI module corresponding to the request of network connection, sending the network connection information to the WI-FI module, to enable the WI-FI module to connect to the network according to the network connection information.

For example, a first WI-FI module in an air conditioner having two WI-FI modules, is associated with a mobile phone terminal. When the mobile phone terminal sends network connection information to the air conditioner, the network connection information is then sent to the first WI-FI module. The first WI-FI module connects to the network according to the network connection information. A user may input network connection information to a user interface of the air conditioner, then the air conditioner sends the received network connection information to a second WI-FI module, the second WI-FI module connects to the network according to the network connection information.

In this embodiment, when receiving a request of network connection, as the terminal has a plurality of WI-FI modules, network connection information of the request of network connection and terminal information of a terminal who sends the request of network connection are obtained. A WI-FI module matching with the terminal can be searched with the terminal information, i.e., a WI-FI module corresponding to the request of network connection. The network connection information is then sent to the WI-FI module, then the WI-FI module may connect to the network according to the received network connection information, to establish an effective connection between the WI-FI module of a terminal and the network, providing a network base for network sharing on a terminal having multiple WI-FI modules.

Figure 5:
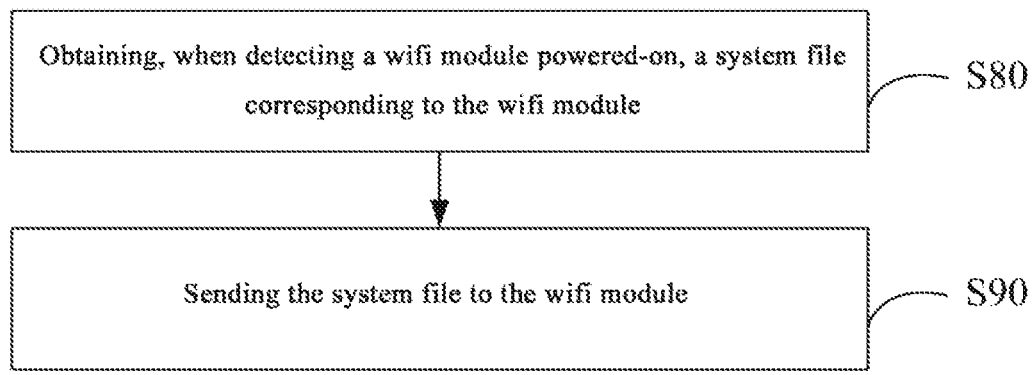
FIG. 5 is a flow chart of a fourth embodiment of a method for network sharing on a terminal in accordance with the present disclosure.

With reference to FIG. 5, a fourth embodiment of a method for network sharing on a terminal is provided, on the basis of any from the first to third embodiment, the method further includes:

Step S80, obtaining, when detecting a WI-FI module powered-on, a system file corresponding to the WI-FI module.

Step S90, sending the system file to the WI-FI module, to enable the WI-FI module to operate.

In a terminal having a plurality of WI-FI modules, a system file of the WI-FI module may be stored in a system chip, to reduce memory capacity of a WI-FI module, therefore, the above-mentioned WI-FI module may be a WI-FI module with small memory capacity. When a WI-FI module is detected to be powered-on, that means the WI-FI module will be used, module information of the powered-on WI-FI module may be obtained, a system file corresponding to the powered-on WI-FI module can be determined according to the module information of the powered-on WI-FI module, then the system file may be sent to the powered-on WI-FI module, to enable normal operation of the powered-on WI-FI module.

In this embodiment, when a WI-FI module is detected to be powered-on, that means the WI-FI module will be used, module information of the powered-on WI-FI module may be obtained, a system file corresponding to the powered-on WI-FI module can be determined according to the module information of the powered-on WI-FI module, then the system file may be sent to the powered-on WI-FI module, to enable normal operation of the powered-on WI-FI module. By reducing memory usage of a WI-FI module, performance requirement to a WI-FI module can be lower, and production cost of a terminal having multiple WI-FI modules can be reduced.

Figure 6:
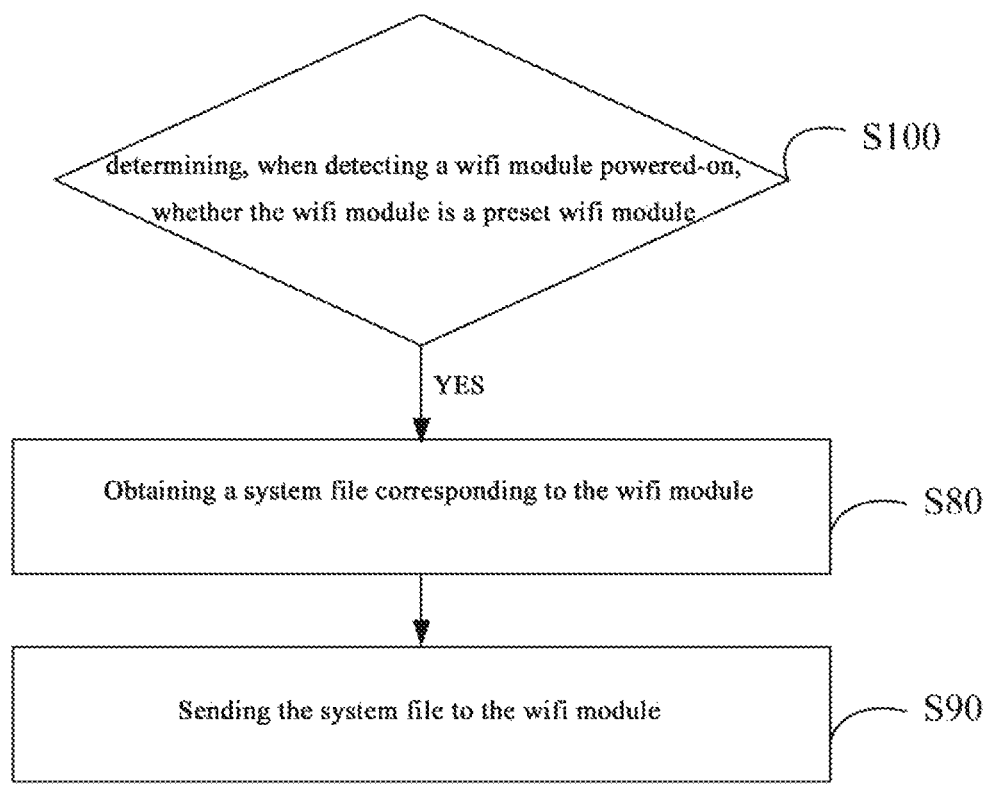
FIG. 6 is a flow chart of a fifth embodiment of a method for network sharing on a terminal in accordance with the present disclosure.

With reference to FIG. 6, a fifth embodiment of a method for network sharing on a terminal is provided, on the basis of any from the first to fourth embodiment, the method further includes:

Step S100, determining, when detecting a WI-FI module powered-on, whether the WI-FI module is a preset WI-FI module.

Executing, if the WI-FI module is a preset WI-FI module, returning to step S80, i.e., the step of obtaining a system file corresponding to the WI-FI module.

In a terminal having a plurality of WI-FI modules, in order to satisfy a requirement of data transmission with large volume of data, and requirement of other high performance required tasks, usually the WI-FI modules are arranged in a system chip. In order to guarantee a high operational performance of such WI-FI modules, a system file required to operate such WI-FI modules may be stored locally in the chip, without a need of accessing from somewhere else. Therefore, the WI-FI module with small memory capacity as described in the previous embodiment may be arranged as a preset WI-FI module. When a WI-FI module is detected to be powered-on, it may judge whether the powered-on WI-FI module is the preset WI-FI module. When the powered-on WI-FI module is a preset WI-FI module, step S80 may be executed to enable normal operation of the powered-on WI-FI module.

In this embodiment, when a WI-FI module is detected to be powered-on, firstly judging whether the powered-on WI-FI module is a preset WI-FI module which is accessing a system file, and when the powered-on WI-FI module is the preset WI-FI module, determining and sending a system file corresponding to the powered-on WI-FI module, to the powered-on WI-FI module. If the powered-on WI-FI module is not requiring a system file, it may be because that the system file is not able to obtain or not able to send, which may lead to system disorders and affect normal operation of a terminal. The above-mentioned problem can be effectively avoided by determining an identity of the powered-on WI-FI module.

Furthermore, the present disclosure also provides an apparatus for network sharing on a terminal, which includes: a memory, a processor, and a program for network sharing stored on the memory and executable on the processor, wherein the program for network sharing, when executed by the processor, implements steps of the method for network sharing on a terminal as described in the above embodiments.

Furthermore, the present disclosure also provides an air conditioner, which includes: a memory, a processor, and a program for network sharing stored on the memory and executable on the processor, wherein the program for network sharing, when executed by the processor, implements steps of the method for network sharing on a terminal as described in the above embodiments.

Furthermore, the present disclosure also provides a computer readable storage medium having a program for network sharing stored thereon, wherein the program for network sharing, when executed by a processor, implements steps of the method for network sharing on a terminal as described in the above embodiments.

Furthermore, the term "include", "comprise" or any other variants thereof is intended to encompass a non-exclusive inclusion, such that a process, method, device, or system including a series of elements not only includes those elements, but also includes other elements that are not explicitly listed, or elements that are inherent to such a process, method, device, or system. In the absence of more restrictions, an element defined by the phrase "including one . . . " does not exclude the existence of additional identical elements in the process, method, device, or system that includes the element.

Furthermore, the numbers of the embodiments according to the present disclosure are merely for description, and do not represent for the advantages and disadvantages of the embodiments.

According to the description of the above-mentioned embodiments, those skilled in the art would clearly understand that the method of embodiments above may be implemented by means of software and a general hardware platform, and also by means of hardware. Based on the understanding, the technical solution of the present disclosure can be embodied in the form of a software product in essence or in part contributing to the prior art. The software product is stored in a storage medium (such as a ROM/RAM, a magnetic disk, an optical disk) as described above, including a plurality of instructions for causing a terminal device (which may be a mobile phone, a computer, a server, an air conditioner, or a network device, and so on.) to execute the method described in various embodiments according to the present disclosure.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A method for network sharing on a terminal, wherein, the terminal comprises a plurality of WI-FI modules, the method comprising:
    obtaining, after a WI-FI module of the terminal connects to a network, network connection information of the WI-FI module connected to the network; and
    sending the network connection information to a to-connect WI-FI module of the terminal, to enable the to-connect WI-FI module to connect to the network according to the network connection information.

2. The method according to claim 1, further comprising: after sending the network connection information to the to-connect WI-FI module of the terminal:
    detecting data to be transmitted;
    obtaining, in response to detecting the data to be transmitted, data information corresponding to the data to be transmitted;
    determining a WI-FI module of the terminal to perform data transmission according to the data information; and
    controlling the WI-FI module determined to perform data transmission to transmit the data to be transmitted.

3. The method according to claim 2,
    wherein the data information corresponding to the data to be transmitted comprises data size of the data to be transmitted.

4. An apparatus for network sharing on a terminal, the apparatus comprising:
    a processor; and
    a memory storing a program for network sharing, wherein the program for network sharing, when executed by the processor, implements the method for network sharing on the terminal of claim 3.

5. The method according to claim 2,
    wherein the data information corresponding to the data to be transmitted comprises information of a receiving terminal for receiving the data to be transmitted.

6. An apparatus for network sharing on a terminal, the apparatus comprising:
    a processor; and
    a memory storing a program for network sharing, wherein the program for network sharing, when executed by the processor, implements the method for network sharing on the terminal of claim 5.

7. The method according to claim 1, further comprising, detecting a request of network connection;
    obtaining, in response to detecting the request of network connection, network connection information of the request of network connection and terminal information of a transmitting terminal transmitting the request of network connection;
    determining a WI-FI module of the terminal corresponding to the request of network connection, according to the terminal information; and
    sending the network connection information of the request of network connect to the WI-FI module corresponding to the request of network connection, to enable the WI-FI module corresponding to the request of network connection to connect to the network according to the network connection information.

8. An apparatus for network sharing on a terminal, the apparatus comprising:
    a processor; and
    a memory storing a program for network sharing, wherein the program for network sharing, when executed by the processor, implements the method for network sharing on the terminal of claim 7.

9. An apparatus for network sharing on a terminal, the apparatus comprising:
    a processor; and
    a memory storing a program for network sharing, wherein the program for network sharing, when executed by the processor, implements the method for network sharing on the terminal of claim 2.

10. The method according to claim 1, further comprising:
    detecting a WI-FI module to be powered-on;
    obtaining, in response to detecting the WI-FI module to be powered-on, a system file corresponding to the WI-FI module detected to be powered-on; and
    sending the system file to the WI-FI module detected to be powered-on, to enable the WI-FI module detected to be powered-on to operate.

11. The method according to claim 10,
    wherein obtaining the system file corresponding to the WI-FI module detected to be powered-on comprises:
        obtaining module information of the WI-FI module detected to be powered-on; and
        obtaining the system file corresponding to the WI-FI module detected to be powered-on according to the module information of the WI-FI module detected to be powered-on.

12. An apparatus for network sharing on a terminal, the apparatus comprising:
    a processor; and
    a memory storing a program for network sharing, wherein the program for network sharing, when executed by the processor, implements the method for network sharing on the terminal of claim 11.

13. The method according to claim 10,
wherein the method further comprises determining, in response to detecting the WI-FI module to be powered-on, whether the WI-FI module to be powered-on is a preset WI-FI module, and
wherein the system file corresponding to the WI-FI module to be powered-on is obtained in response to determining that the WI-FI module to be powered-on is the preset WI-FI module.

14. The method according to claim 13, further comprising:
wherein the method further comprises determining whether a memory capacity of the WI-FI module to be powered-on is less than a preset threshold, and
wherein determining whether the WI-FI module to be powered-on is the preset WI-FI module is performed in response to determining that the memory capacity of the WI-FI module to be powered-on is less than the preset threshold.

15. An apparatus for network sharing on a terminal, the apparatus comprising:
a processor; and
a memory storing a program for network sharing, wherein the program for network sharing, when executed by the processor, implements the method for network sharing on the terminal of claim 10.

16. The method according to claim 1,
wherein the network connection information comprises at least one of network name, network address, and network password.

17. The method according to claim 1, further comprising:
determining whether the WI-FI module of the terminal is connected to the network,
wherein the WI-FI module of the terminal is determined to be connected to the network when the WI-FI module obtains the network connection information and connects to the network.

18. An apparatus for network sharing on a terminal, the apparatus comprising:
a processor; and
a memory storing a program for network sharing, wherein the program for network sharing, when executed by the processor, implements the method for network sharing on the terminal of claim 1.

19. An air conditioner comprising:
a processor; and
a memory storing a program for network sharing, wherein the program for network sharing, when executed by the processor, implements a method for network sharing on the air conditioner, the method comprising:
obtaining, after a WI-FI module of the air conditioner connects to a network, network connection information of the WI-FI module connected to the network; and
sending the network connection information to a to-connect WI-FI module of the air conditioner to enable the to-connect WI-FI module to connect to the network according to the network connection information.

20. A non-transitory computer readable storage medium having a program for network sharing stored thereon, wherein the program, when executed by a processor, implements a method for network sharing on a terminal, the method comprising:
obtaining, after a WI-FI module of the terminal connects to a network, network connection information of the WI-FI module connected to the network; and
sending the network connection information to a to-connect WI-FI module of the terminal, to enable the to-connect WI-FI module to connect to the network according to the network connection information.

* * * * *